United States Patent
Emanuel et al.

(10) Patent No.: US 8,550,115 B2
(45) Date of Patent: Oct. 8, 2013

(54) VALVE POSITION INDICATOR

(75) Inventors: Blake J. Emanuel, Hubbard, OH (US); Francis Craig Newmeyer, Niles, OH (US)

(73) Assignee: Trumbull Industries, Inc., Youngstown, OH (US)

(*) Notice: Subject to any disclaimer, the term of this patent is extended or adjusted under 35 U.S.C. 154(b) by 493 days.

(21) Appl. No.: 12/831,745

(22) Filed: Jul. 7, 2010

(65) Prior Publication Data

US 2011/0017324 A1 Jan. 27, 2011

Related U.S. Application Data

(60) Provisional application No. 61/227,232, filed on Jul. 21, 2009.

(51) Int. Cl.
*F16K 37/00* (2006.01)

(52) U.S. Cl.
USPC .................................. 137/556.6; 137/360

(58) Field of Classification Search
USPC ................. 137/553, 556, 556.3, 556.6, 360
See application file for complete search history.

(56) References Cited

U.S. PATENT DOCUMENTS

| | | | |
|---|---|---|---|
| 2,515,837 A * | 7/1950 | Quinn | 116/277 |
| 2,530,164 A | 11/1950 | Harshbarger | |
| 3,363,601 A | 1/1968 | Mills, III | |
| 3,505,972 A * | 4/1970 | Benjamin | 116/277 |
| 3,602,254 A | 8/1971 | Fawkes | |
| 3,656,504 A | 4/1972 | Topinka | |
| 4,411,288 A | 10/1983 | Gain, Jr. | |
| 4,655,160 A * | 4/1987 | Ligh | 116/277 |
| 5,137,052 A | 8/1992 | Baumgart | |
| 5,623,963 A | 4/1997 | Stommes et al. | |
| 5,647,396 A | 7/1997 | Stommes et al. | |
| 5,738,140 A * | 4/1998 | Mann | 137/369 |
| 6,145,537 A | 11/2000 | McCutcheon | |
| 6,597,290 B2 | 7/2003 | Mogi | |
| 6,698,103 B2 * | 3/2004 | Nortier et al. | 33/645 |
| 6,820,647 B1 | 11/2004 | Grecco et al. | |
| 7,028,927 B2 * | 4/2006 | Mermet | 239/569 |
| 7,308,907 B2 * | 12/2007 | Ouyoung | 137/360 |
| 2009/0145493 A1 * | 6/2009 | Lee | 137/360 |

* cited by examiner

*Primary Examiner* — John K Fristoe, Jr.
*Assistant Examiner* — Time Aigbe
(74) *Attorney, Agent, or Firm* — Roger Emerson; Emerson Thomson Bennett

(57) ABSTRACT

A valve position assembly is described herein, wherein the assembly includes a sun gear, at least one planet gear, two ring gears, wherein the planet gear engages with the sun gear and the ring gears, wherein the planet gear has a diameter which is smaller than a diameter of the sun gear, and the diameter of the planet gear is smaller than a diameter of the ring gears, and a scale plate, wherein the plate comprises a position indicator.

14 Claims, 14 Drawing Sheets

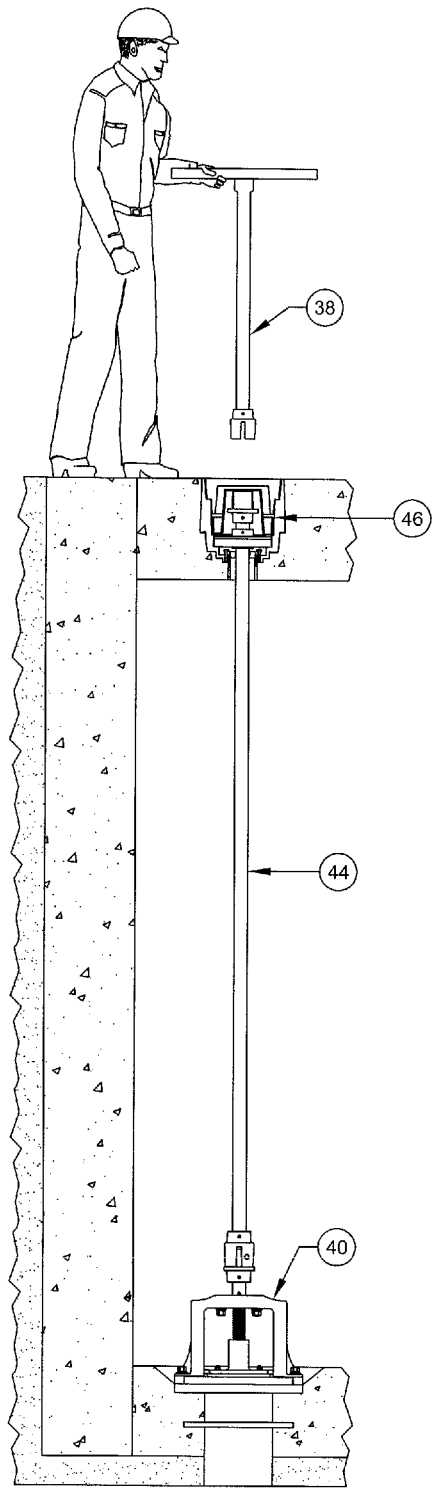
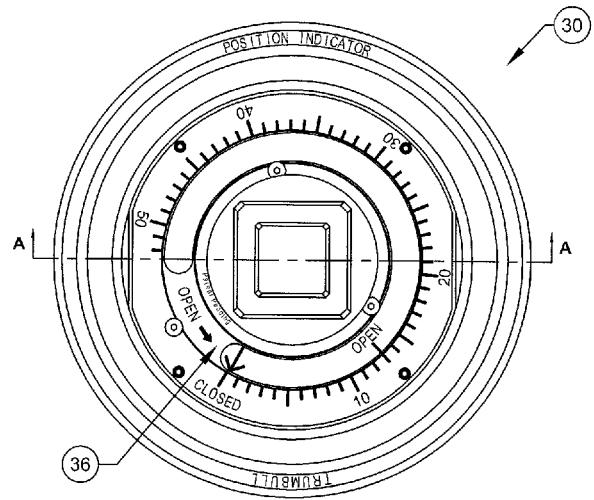
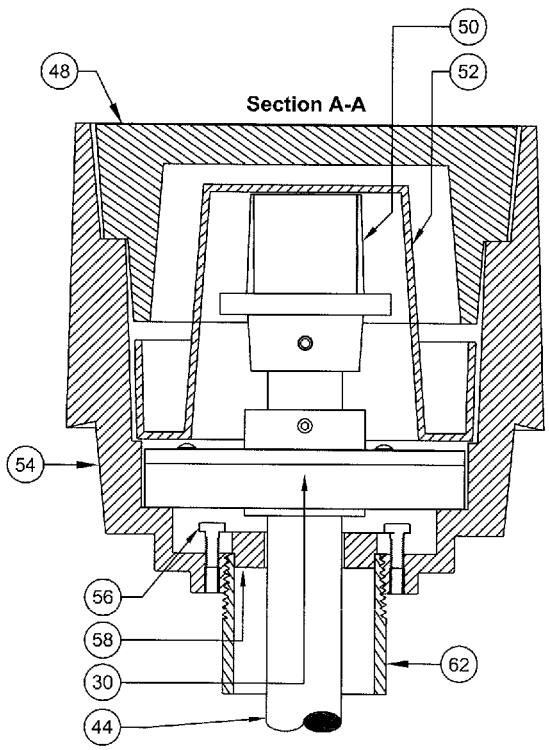
FIGURE 7B
FIGURE 7C
FIGURE 7A

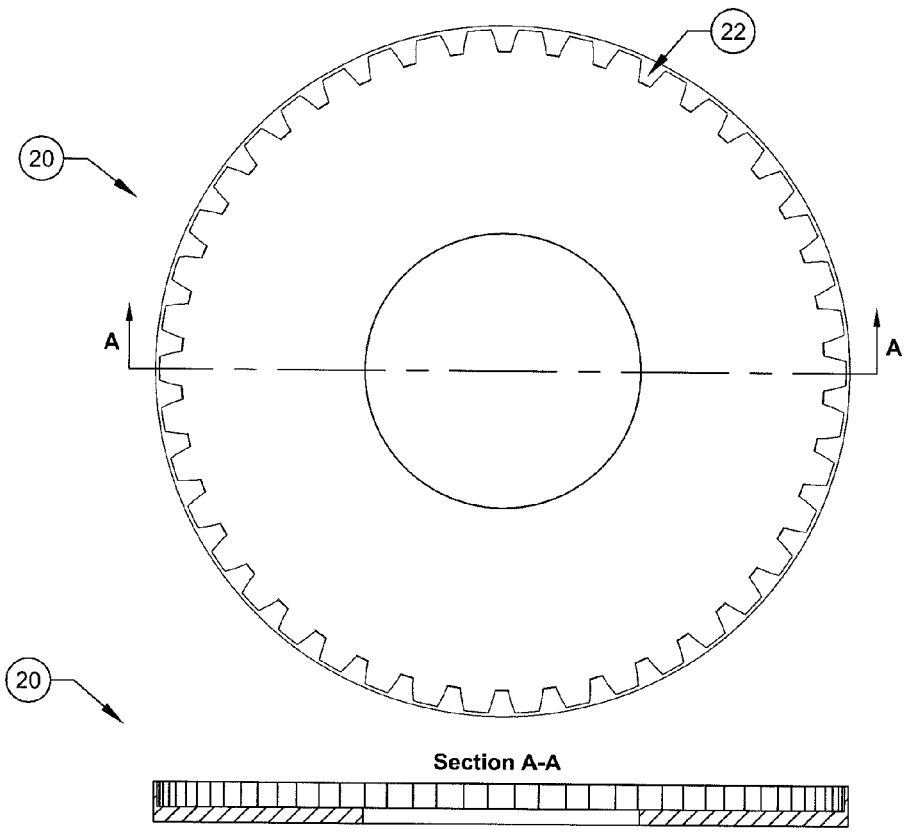
FIGURE 10A
FIGURE 10B
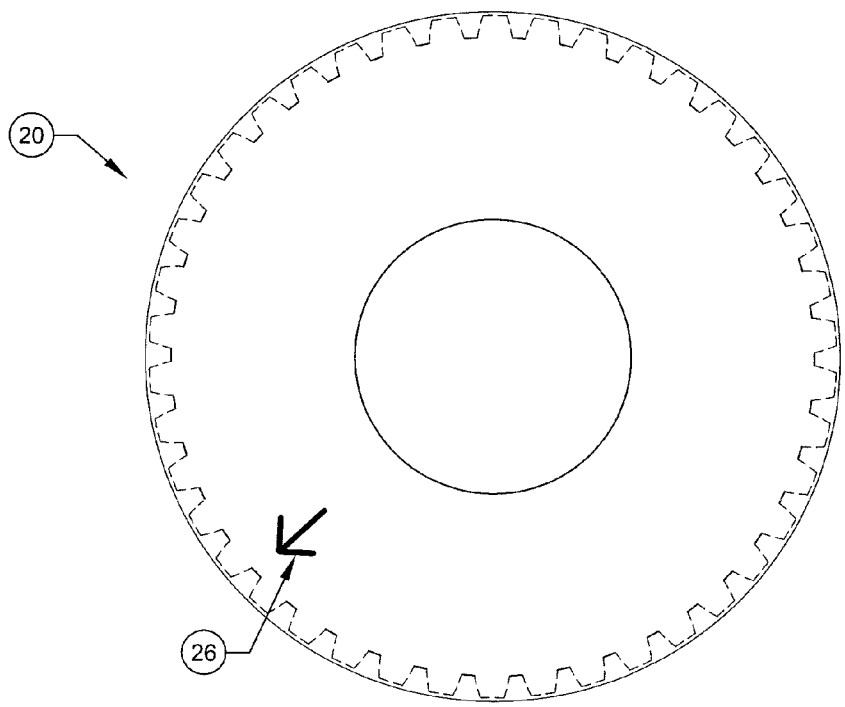
FIGURE 10C

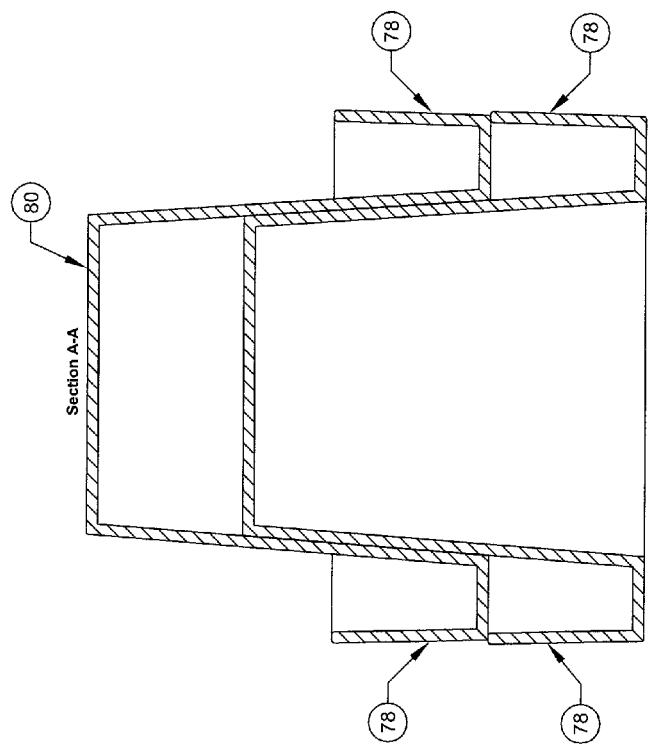
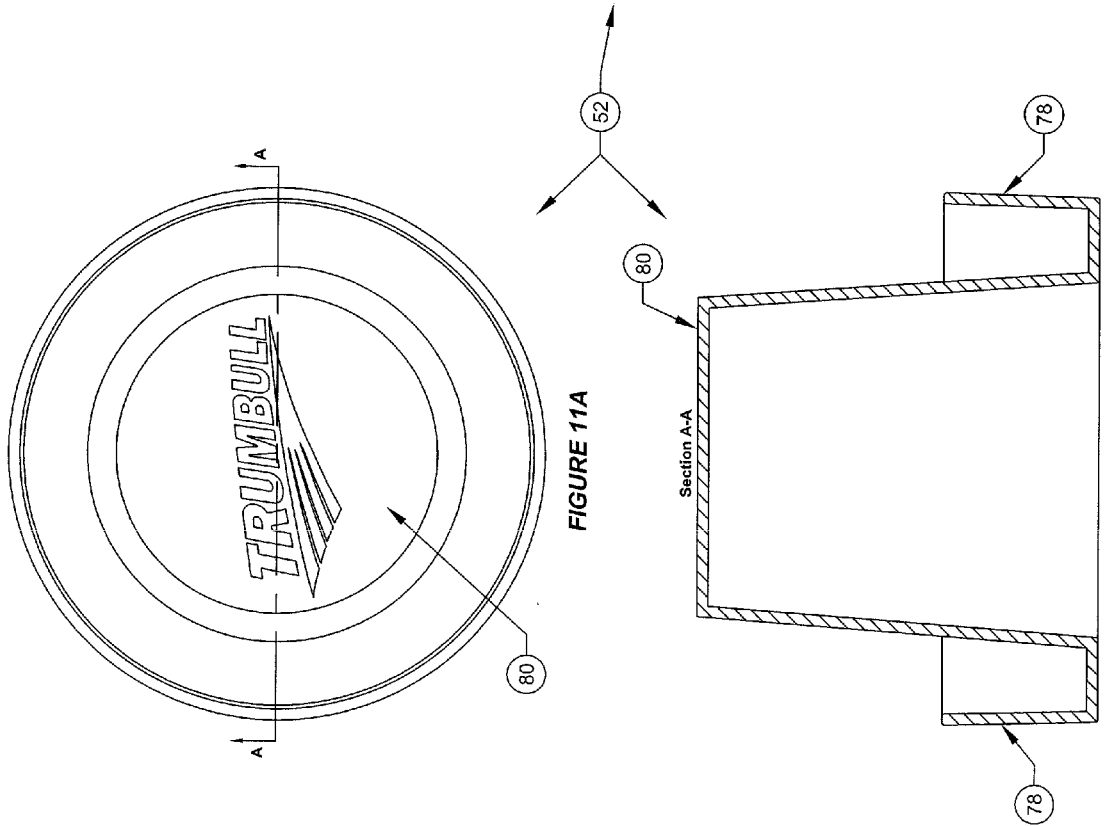
*FIGURE 11A*
*FIGURE 11B*
*FIGURE 11C* ental application, entitled VALVE POSITION INDICATOR, Ser. No. 61/227,232, filed Jul. 21, 2009, the contents of which are hereby incorporated by reference. The present invention generally relates to valves. More specifically, the present invention relates to methods and apparatuses for a valve position indicator.

I. BACKGROUND

In one embodiment, the valves are used in municipal water and wastewater systems. The valves can be installed underground or above ground, in a water or wastewater treatment plant. In addition, the invention can be used in applications other than the municipal industry, where it is likewise desirable to know the position of a valve.

For underground installations, a valve box can be placed over the valve to provide access to the valve, so it can be opened or closed from ground level by means of a valve extension stem and two inch square nut. The invention will be secured to the valve extension stem and mounted inside a position indicator adapter.

Whereas valves installed underground are typically buried with a valve box, installations in a water or wastewater treatment plant can come in many different types. The four most common installations are: floor box, floorstand, motor operator, and extension stem and nut for valve wrench.

On order forms, the customer typically must specify "direction to open" either CW (clockwise) or CCW (counterclockwise). All of the valves in a municipal water system either open CW or CCW. For example, valves in Akron and Cleveland open by turning to the right (CW) and close by turning CCW. However, the cities of Cuyahoga Falls and Hudson open by turning CCW and close by turning CW.

A typical epicyclic gear system will usually consist of at least one planet gear, or "outer gear," revolving about a sun gear, or "central gear." Also, some systems may integrate the use of ring gears, or "internal gears," having inward facing teeth that mesh with the planet gear teeth. Although there are many epicyclical gearing setups used to transfer input rotation into output rotation, the gear ratios are almost always contingent upon the number of teeth on each gear that is used, and also upon which gear is held stationary, or "fixed."

II. SUMMARY

The invention consists of a valve position indicator, wherein an epicyclic gear system is used to determine the position of the valve. The position of the valve can be easily and quickly determined independent of the direction of turning.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 7A shows a perspective view of the position indicator and adapter installation for valves in a tank or reservoir;

FIG. 7B shows a top view of the position indicator with a square nut inside an adapter for valves in a tank or reservoir;

FIG. 7C shows a sectional view of the position indicator installed in an adapter, with a debris shield, square nut, and pipe nipple for embedding into concrete floor of a tank or reservoir;

FIG. 10A shows the bottom surface of the top ring gear;

FIG. 10B shows a sectional view of the top ring gear;

FIG. 10C shows the top surface of the top ring gear;

FIG. 11A shows a top view of the debris shield;

FIG. 11B shows a sectional view of the debris shield;

FIG. 11C shows a sectional view of stacked debris shields;

IV. DEFINITIONS

Epicyclic gearing—a gear system that consists of one or more outer gears revolving about a central gear. Epicyclic gearing systems may also incorporate the use of outer ring gears or annuluses, which mesh with the outer gear teeth.

Fixed gear—the gear held stationary.

Floating gear—the moving gear.

Gear—a toothed mechanism that engages another toothed mechanism in order to change the speed or direction of transmitted motion.

Gear ratio—Ratio of the numbers of teeth on mating gears.

Planet gear—outer gear(s) in an epicyclic gearing system.

Sun gear—central gear in an epicyclic gearing system.

V. DETAILED DESCRIPTION

Figure 1:
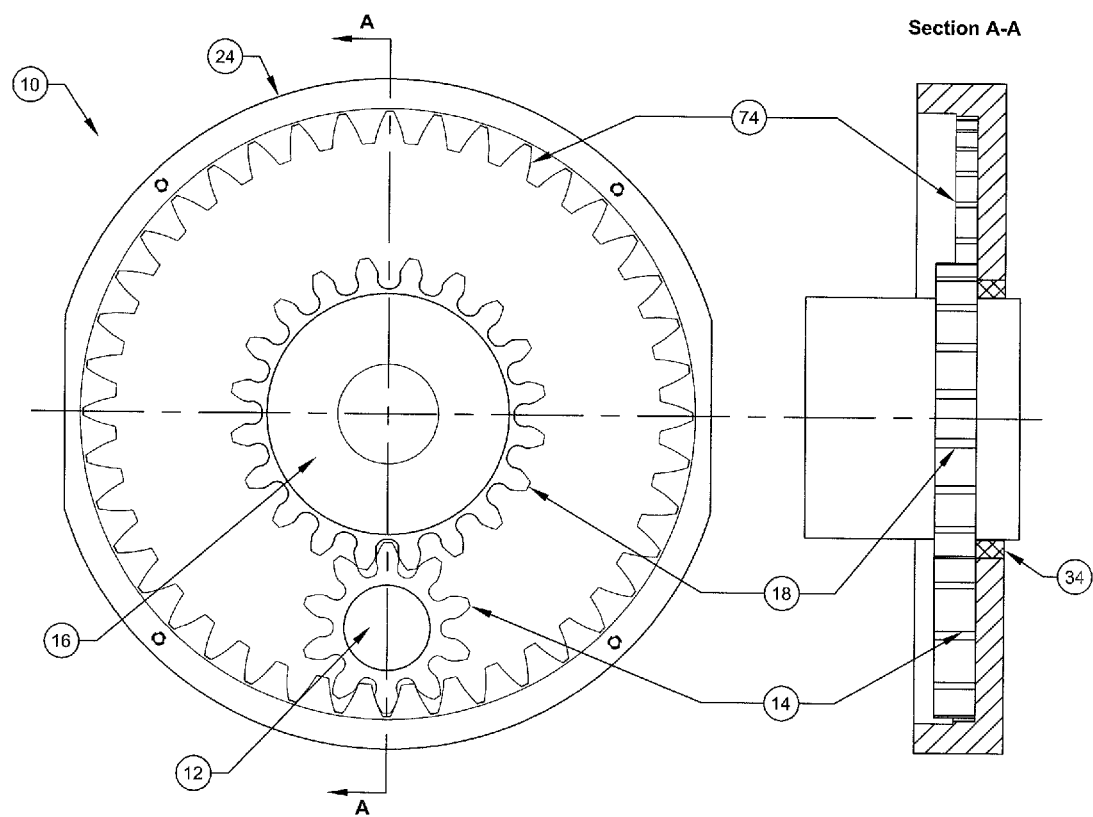
FIG. 1 shows a top and sectional view of the epicyclic gear assembly, with the sun gear, planet gear, and bottom ring gear.
Figure 2:
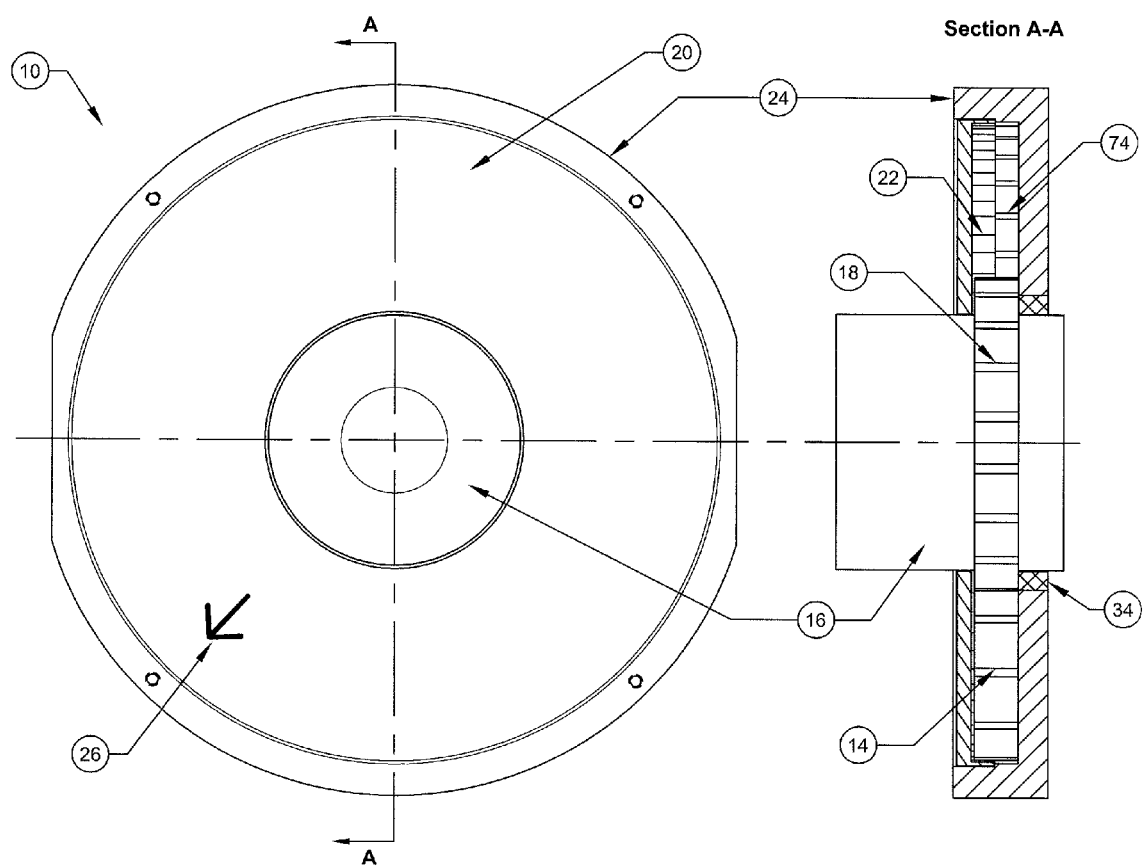
FIG. 2 shows a top and sectional view of the epicyclic gear assembly; with the top ring gear in place, covering the sun gear, planet gear, and bottom ring gear.
Figure 3:
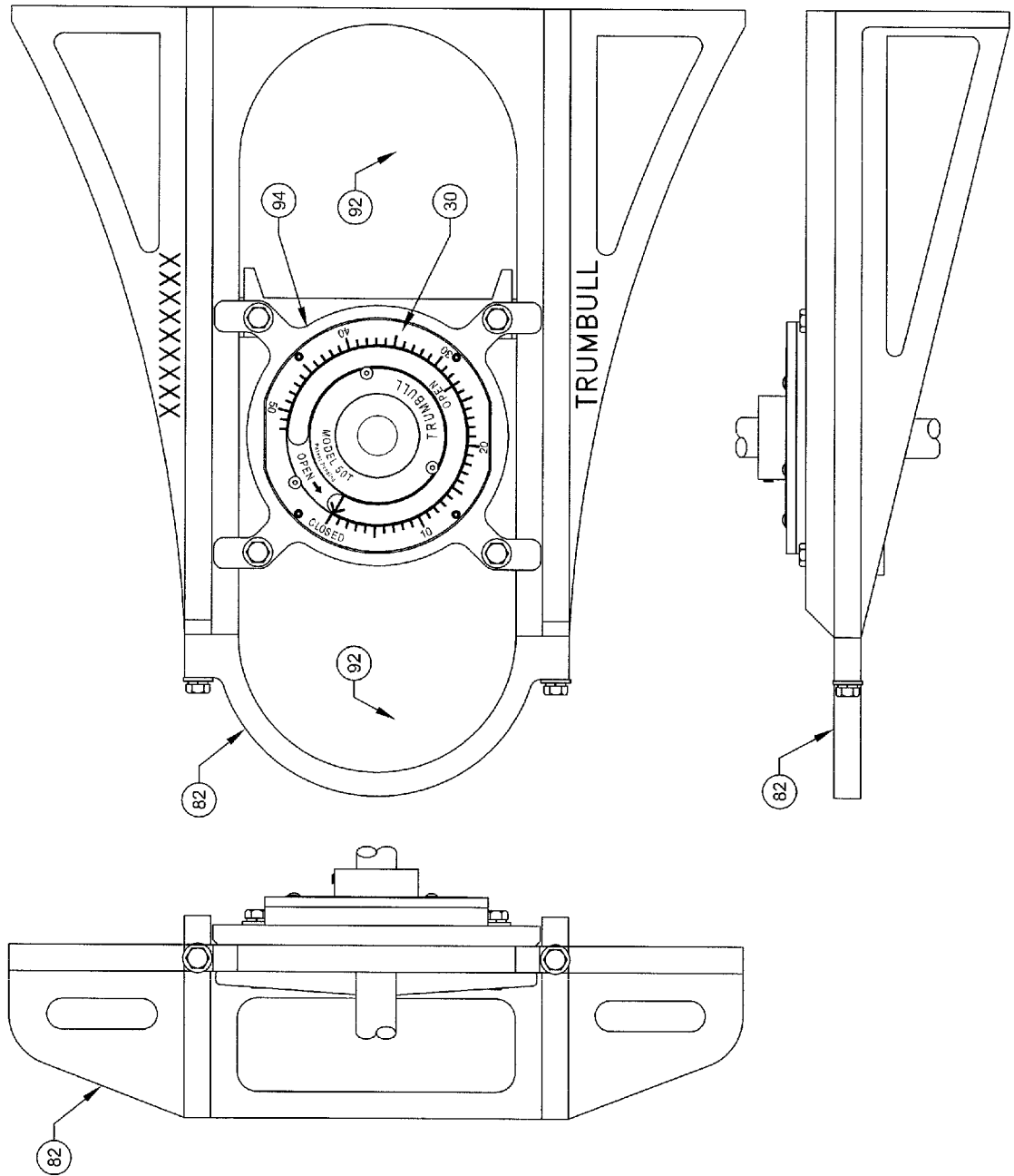
FIG. 3 shows several views of a wall bracket with the valve position assembly.
Figure 4:
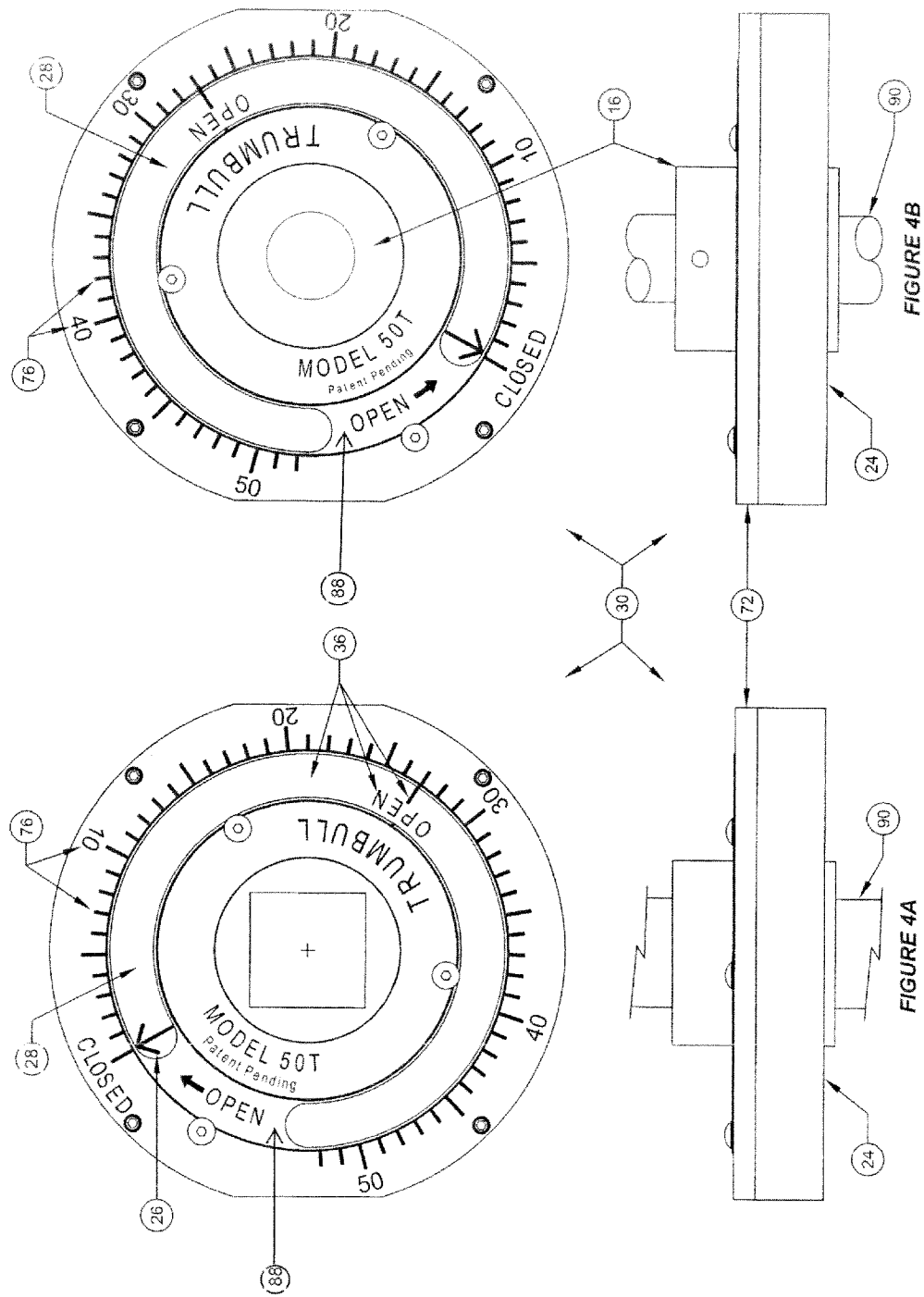
FIG. 4A shows a top and side view of the position indicator with a square bored sun gear.
FIG. 4B shows a top and side view of the position indicator with a round bored sun gear.
Figure 5:
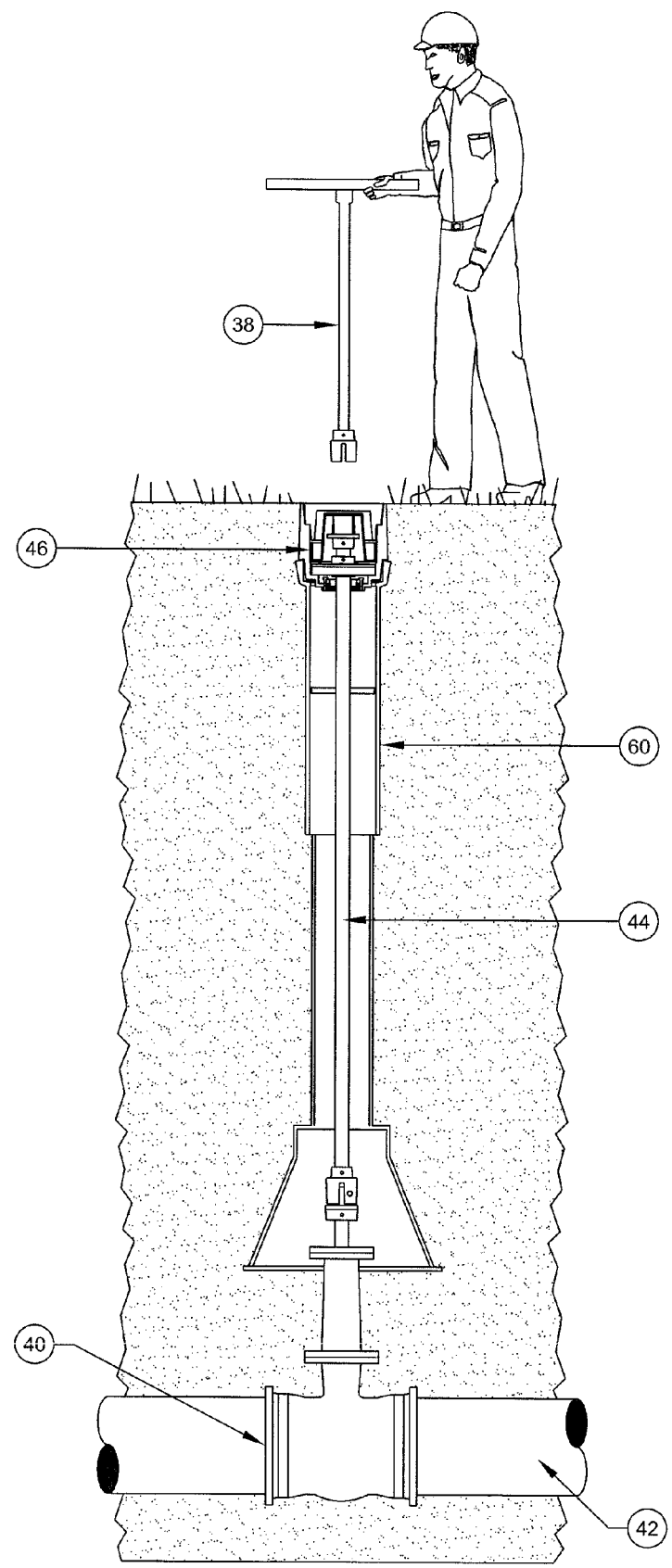
FIG. 5 shows a perspective view of the position indicator and adapter installation for underground valves.

The present invention is a useful accessory in many types of valve installations. It is beneficial to a valve operator by means of allowing him/her to identify the position of a valve, with respect to "open," "closed," or an intermediate position, in addition to the number of turns from the open position and direction of rotation. With reference now to FIGS. 1 and 2, the FIGURES show an epicyclic gear assembly 10, which comprises a planet gear 12, planet gear teeth 14, sun gear 16, sun gear teeth 18, top ring gear 20, top ring gear teeth 22, bottom ring gear 24, and bottom ring gear teeth 74. The planet gear teeth 14 engage with the sun gear teeth 18, as well as the top ring gear teeth 22, and the bottom ring gear teeth 74.

With reference now to FIGS. 3, 4A, 4B, 5, 6A, 6B, 7B, 7C, 8, and 12, a position indicator 30 is shown. The position indicator 30 allows position indication on different types of valves 40, which typically open left (ccw) or open right (cw). A valve 40 is installed in a pipeline 42 and is manually operated using a "key" or T-wrench 38. The top face of the scale plate 72 has an annular recess 88 with an adjustable window 36 that is used for valves 40 that open left (ccw) and the bottom face of the scale plate 72 has an annular recess 88 with an adjustable window 36 that is used for valves 40 that open right (cw). The position indicator 30 is ready to be installed on a valve operating stem 90. Subsequently, if the position indicator 30 is to be installed on a valve 40 that opens in the opposite direction of the initial assembly, the scale plate 72 can be removed, flipped 180 degrees, and reinstalled to allow indication in the opposite direction.

The scale plate 72 is fastened to the bottom ring gear 24 by means of four socket head cap screws 64, which facilitate removal and reversal of direction indication.

In addition to the turn number indicator 76 that is present on each side of the scale plate 72, an annular recess 88 is present on each side for placement of the adjustment window 36. A 300 degree annular slot 28 is located through the scale plate 72 in the center of the annular recess 88, for viewing the position indicator arrow 26, located on the top "floating" ring gear 20, which is below the scale plate 72.

In one embodiment, the adjustable window 36 is a flat transparent ring with the word "OPEN" on it, and an indicating line located on the top surface. The window 36 is placed in the annular recess 88 located on the "in use" side of the scale plate 72, calibrated for the specific valve 40 it is installed on, and then secured to the scale plate 72. Calibration is achieved by aligning the indicating line on the window 36 with the number of turns it takes to open the valve 40 from the closed position, on the turn number indicator 76, located on the scale plate 72.

In one embodiment, the window 36 is secured with button head cap screws (BHCS) 66 on the scale plate 72. As each BHCS 66 is threaded into the scale plate 72, the outer diameter of each head captures the top surface of the window 36, which protrudes beyond the top surface of the scale plate 72, and secures the components together.

In one embodiment, the scale plate 72 and window 36 are pre-assembled to accommodate a valve 40 with a specific number of turns to open. Subsequently, the scale plate 72 can be flipped 180 degrees and reinstalled to allow indication in the opposite direction. In one embodiment, removal of the scale plate 72 is accomplished by unscrewing four socket head cap screws (SHCS) 64, which hold the scale plate 72 to the bottom ring gear 24. After the scale plate 72 is flipped 180 degrees, each SHCS 64 can be reinstalled in the reverse order of removal. No additional components are required to complete this changeover.

In one embodiment, the outside diameter of the sun gear 16 is sealed to prevent water from entering the position indicator 30 and fogging the lens of the adjustable window 36. The position indicator 30 can either be sealed or not sealed. Each version is essentially the same, except the sealed version is manufactured with two seals 34 used to prevent water and debris intrusion. In one embodiment, the seal 34 is located between the sun gear 16 and scale plate 72 and the other seal 34 is located between the sun gear 16 and the bottom ring gear 24.

Figure 12:
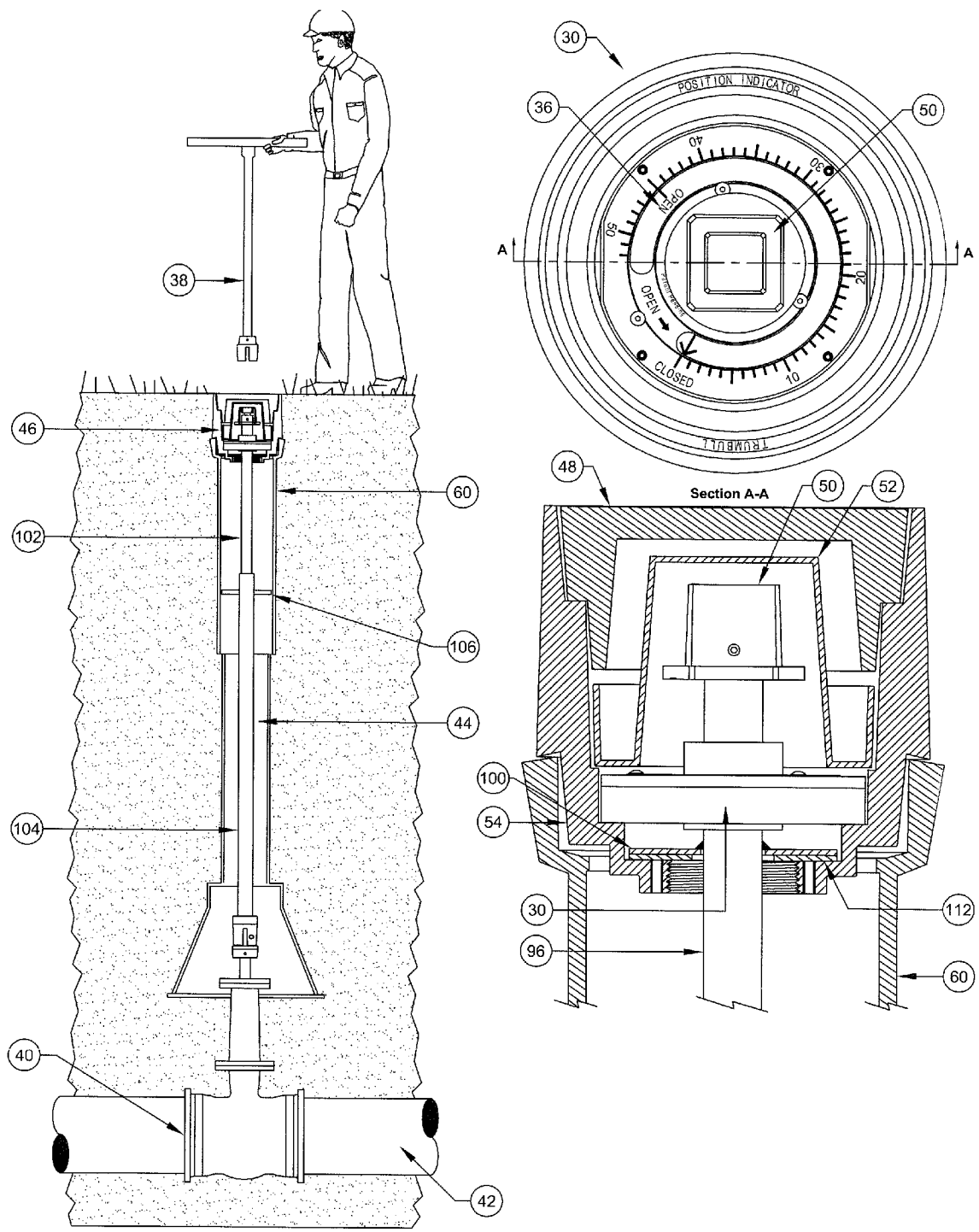
FIG. 12 shows a perspective view of the position indicator and adaptor with telescoping functionality.

With reference now to FIG. 12, installing a position indicator on a buried valve is more challenging than the installation on a valve in a tank or reservoir (see FIGS. 7A, 7B, and 7C). In both cases, the position indicator is housed within a cast iron adapter 54. As can be seen from the drawings, the 2 inch square nut 50 operating the valve 40 has limited clearance above the position indicator and below the valve box lid 48. The difficulty arises in determining the precise length of the extension stem 44, to meet the required clearances for the out 50. For a valve installed in a tank or reservoir, the installer can make adjustments to the extension stem 44 length by cutting from the exposed length below the adapter 54. There is access below the adapter 54 to connect the shortened length to the valve 40. In a valve box 60, there is no access below the cast iron adapter 54 for the installer to cut the extension stem 44 length and connect to the valve 40. The length required depends on the finished grade of the valve box 60, which is difficult to predict precisely, and generally is a final field adjustment. A square telescoping extension stem 96 is unique for use with a position indicator installed on a buried valve. A telescoping design gives the installer the needed flexibility when ordering the extension stem length needed for the approximate valve installation depth. In one embodiment, the upper telescoping stem 102 will be 1¼ inch square tubing and will slide inside 1½ inch square tubing (the dimensions of the tubing can be any dimension chosen using sound engineering judgment). The lengths of the two components will provide a minimum of six inches of engagement of the smaller component inside the larger component, to transmit the operating torque. The additional length beyond the required engagement will provide an adjustment range of depth that the installer can count on when ordering for predicted depths of bury. The upper stem 102 (1¼ inch) will have a stop plate 100 to insure that the nut 50 will be located at the exact height required for clearances above and below the position indicator. Between the stop plate 100 and adapter 54 is an anti-friction disk 112, used to reduce friction between the two metal components. The lower telescoping stem 104 will have a centering ring 106 to keep it centered inside the valve box 60, making it easier to locate and slide the upper stem 102 within it. The use of telescoping stems 96 and stop plates 100 will save the installer time and difficulty in field cutting and locating the nut 50 and the precise location required.

Figure 13:
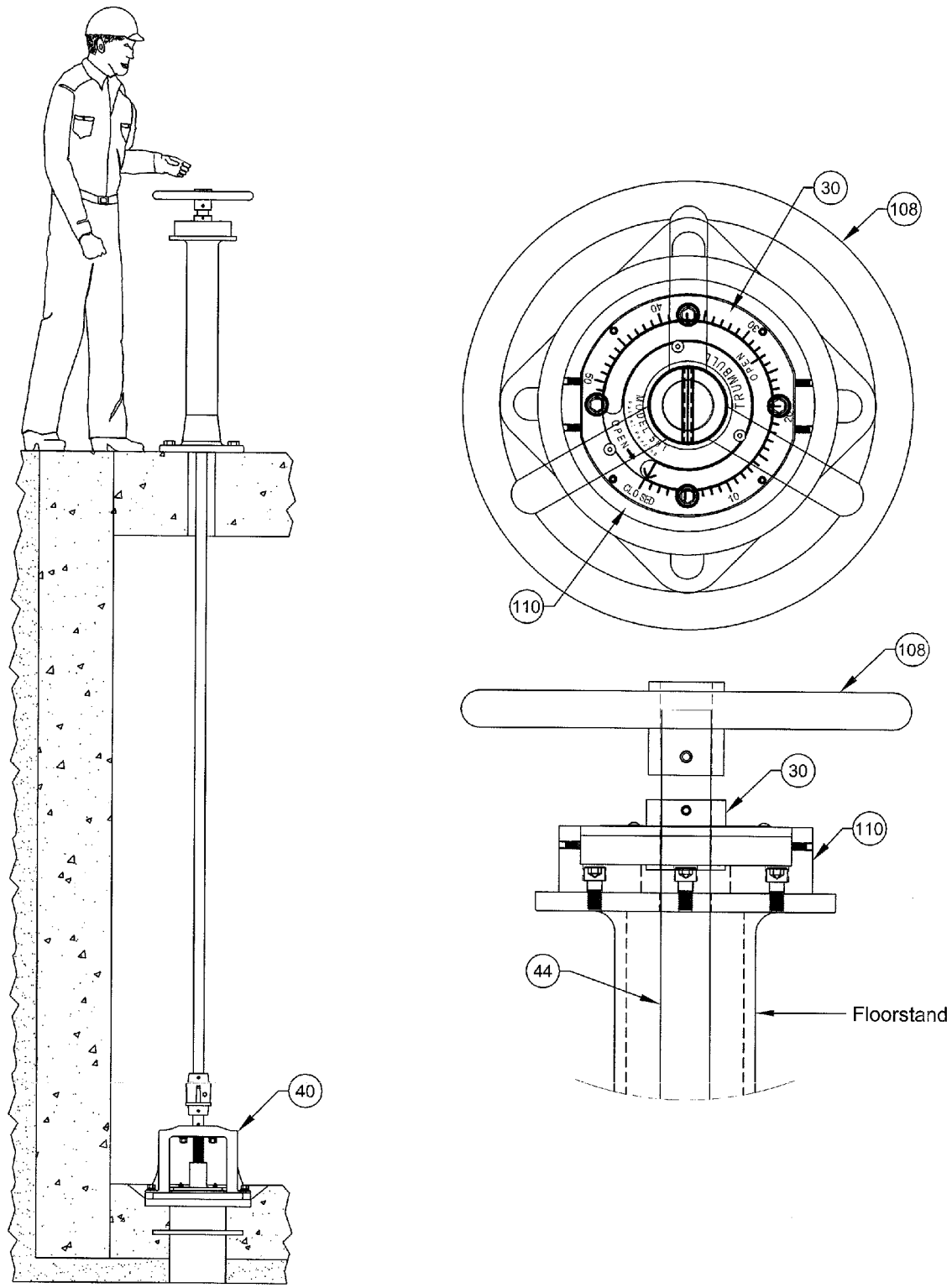
FIG. 13 shows a perspective view of the position indicator and floorstand installation; and, FIG. 14 shows a perspective view of the position indicator and gear operator installation.
Figure 14:
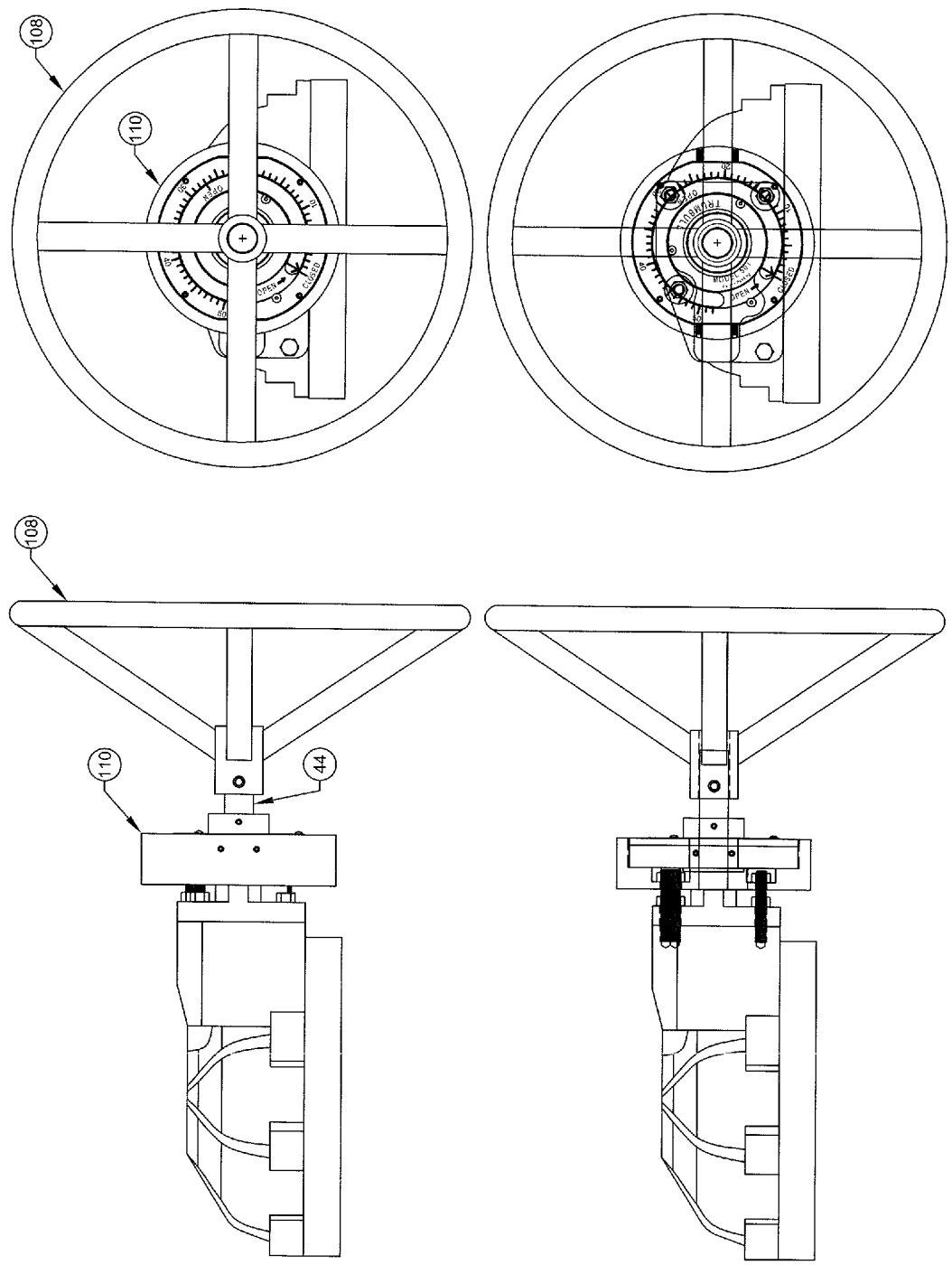

With reference now to FIG. 13, the operation of a valve 40 is assisted by a floorstand. Many valves are installed in a lower floor of a building but operated from a higher floor level, through a floorstand, by means of rotating a handwheel 108. Some floorstands provide indication of the valve's position, while others do not. In one embodiment, the position indicator 30 can be mounted on the top flange of the floorstand by means of a mounting plate 110. With reference now to FIG. 14, the operation of the valve 40 is assisted by a gear operator. Some gear operators provide indication of the valve's position, while others do not. In this embodiment, the position indicator 30 can be mounted on a gear operator by means of a mounting plate 110, and operated by means of a handwheel 108 to allow for ease of operation.

Several different embodiments can indicate (in 300°) from 0 to 52 turns, 0 to 102 turns, 0 to 252 turns, 0 to 402 turns, 0 to 502 turns, and 0 to 802 turns. Each model consists of a sun gear 16, planet gear 12, bottom "fixed" ring gear 24, top "floating" ring gear 20, scale plate 72, adjustable window 36, and hardware, such as BHCS 66 and SHCS 64, which is used to secure certain components together. The input to each gear system is the sun gear 16, which is secured to and rotates with the valve stem 90. The output from each system is the top "floating" ring gear 20, which has an position indicator arrow 26 located on the upper surface and is seen through the 300 degree annular slot 28 on the scale plate 72. As the sun gear 16 is rotated, the arrow 26 rotates under the 300 degree annular slot 28 and points to a character on the turn number indicator 76 that is located on the "in use" face of the scale plate 72. For instance, if a valve operator rotates the valve stem 90 five turns from the closed position, the arrow 26 will rotate from zero to indicate five on the turn number indicator 76. The top ring gear 20 and the bottom ring gear 24 mate together to form a casing (shown but not referenced) around the sun gear 16 and planet gear 12. The bottom ring gear 24 is connected to the scale plate 72 and is held fixed. The top ring gear 20 rotates freely inside a cavity in the bottom ring gear 24. It is to be understood that more than two ring gears can be used.

For each position indicator 30, there are two factors in the design of the input/output gear ratios. The first factor is the gear ratio of the sub-assembly, without the top "floating" ring gear 20. In this embodiment, three sub-assemblies are used for six different models. The second factor is the gear ratio in the entire gear assembly 10, which includes the top "floating" ring gear 20. By increasing the number of teeth 22 in the top "floating" ring gear 20 from one to two more than the bottom "fixed" ring gear 24, two different output ratios are generated.

Based upon the number of top ring gear teeth 22 and bottom ring gear teeth 74 on the top ring gear 20 and bottom ring gear 24, and which gear is held "fixed" in the sub-assembly, the planet gear 12 will complete one revolution about the sun gear 16 and around the inward facing teeth 74 on the bottom "fixed" ring gear 24, after the sun gear 16 itself has rotated three revolutions.

In one embodiment, the top "floating" ring gear 20 is inserted into the bottom "fixed" ring gear 24, which has a recessed cavity that accepts it. The top "floating" ring gear 20 has two more teeth than the bottom "fixed" ring gear 24 has. This means that every time the planet gear 12 completes one revolution about the sun gear 16 and around the inward facing teeth 74 on the bottom "fixed" ring gear 24, which is accomplished by rotating the sun gear 16 three revolutions, the top "floating" ring gear 20 will rotate the distance of two teeth. In order for the top "floating" ring gear 20 to rotate one complete revolution in this example, the sun gear 16 will need to rotate 63 revolutions. Since the slot 28 on the scale plate 72 displays 300 degrees (0.83 revolutions), the turn number indicator 76 on both sides will indicate from 0 to 52 turns (one for each direction of rotation). The number of teeth on the ring gears 20, 24 determines the number of turns that can be accomplished. The turn number indicator 76 labels the number of turns, which can be any number chosen using sound engineering judgment. The shape of the individual teeth can be any shape chosen using sound engineering judgment. In one embodiment, the gears and teeth are made of a low friction, self-lubricating polymer.

In another embodiment, the top "floating" ring gear 20 has one more tooth than the bottom "fixed" ring gear 24 has. This means that every time the planet gear 12 completes one revolution about the sun gear 16 and around the inward facing teeth 74 on the bottom "fixed" ring gear 24, which is accomplished by rotating the sun gear 16 three revolutions, the top "floating" ring gear 20 will rotate the distance of one tooth. In order for the top "floating" ring gear 20 to rotate one complete revolution in this example, the sun gear 16 will need to rotate 123 revolutions. Since the slot 28 on the scale plate 72 displays 300 degrees (0.83 revolutions), the turn number indicator 76 on both sides will indicate from 0 to 102 turns (one for each direction of rotation). Rotating the distance of one tooth, rather than the two teeth that the other embodiment rotates, will allow the arrow 26 to rotate at half the rate of the previous embodiment.

In one embodiment, the position indicator 30 provides the ability to effectively indicate position of valves 40 with 52 turns or less. The position indicator 30 shows a meaningful amount of movement in the position indicator arrow 26. If the arrow 26 only moves a small distance, say 5% of the opening of the indicating window 36, it does not give the user a meaningful view of how many times the valve 40 has been turned and how many more turns are required to fully open, or fully closed. This embodiment provides a 52 turn model by increasing the number of teeth 22 in the "floating" ring gear 20. This accommodates the most common sizes of gate valves 40 used in an underground distribution system and other piping systems, and also plug valves, mud valves, and other valve types with a small number of turns to open.

In one embodiment, the position indicator 30 provides the ability to effectively indicate position of valves 40 with more than 250 turns. The most common sizes of butterfly valves range between 48 to 72 turns. However, the number of turns for mud valves ranges from 5 to 22 turns. For gate valves, which range from 2 inches to 66 inches, the number of turns ranges from as low as 8 turns to as much as 800 turns. Some prior art models are designed for too many turns to handle the limited number of turns for most mud valves and smaller sizes of gate valves. For example, for a valve with only 5 turns to open, the position indicator arrow 26 would only move about 5% of the turn number indicator 76. That would generally be considered too little movement from the open to closed positions. In this embodiment, the position indicator arrow 26 moves at least 10% of the turn number indicator 76.

Some valves 40 that are buried in the ground or submerged in water or wastewater typically require extension stems 44. Extension Stems 44 that are submerged are usually extended beyond the water level and supported by a wall bracket 82 that is bolted to the wall. Two options to operate the valve 40 include a floorstand or a floor box. An indicating floorstand provides position indication. When the stem 44 terminates in a concrete floor, a floor box is used. The floor box provides access to the two inch square nut on top of the valve's extension stem 44, to open or close the valve 40. In one embodiment, a wall bracket 82 is used to secure the position indicator 30. The wall bracket 82 is designed for adjustability. The bracket 82 has a slot 92 that allows horizontal (side to side) adjustability of the adapter plate 94. The length of the slot 92 can be greater than the width of the slot 92. The length of the slot 92 can be sufficiently long to allow securement of the position indicator 30 into a first position relative to the bracket 82 and into a second position relative to the bracket 82 significantly different from the first position.

In one embodiment, a debris shield 52 is used to cover the position indicator 30. When valves 40 are installed underground, their locations are typically in the street. The lids 48 covering the adapters 54 and valve boxes 60 are not sealed tightly. It is common for dirt, asphalt, and slag to pass the lid 48, making it possible for the adjustable window 36 of a position indicator arrow 26 to be covered with foreign material. In order to keep the window 36 clean, the debris shield 52 is placed over the position indicator 30, the user can simply dump out the debris shield 52 before operating the valve 40 and viewing its window 36. The debris shield 52 has a top surface 80, and stacking flanges 78. The stacking flanges 78 allow multiple debris shields 52 to be stacked prior to use, as is shown in FIG. 11C.

In one embodiment, the sun gear 16 is provided with a square bore, to fit an extension stem made of square tubing or bar stock. Some users feel a square bore is better suited for a particular application, since the flat sides of the extension stem 44 turn the flat inside of the sun gear 16. In contrast with a round stem, reliance is placed on a pin in the sun gear 16 to turn the stem.

Figure 6A:
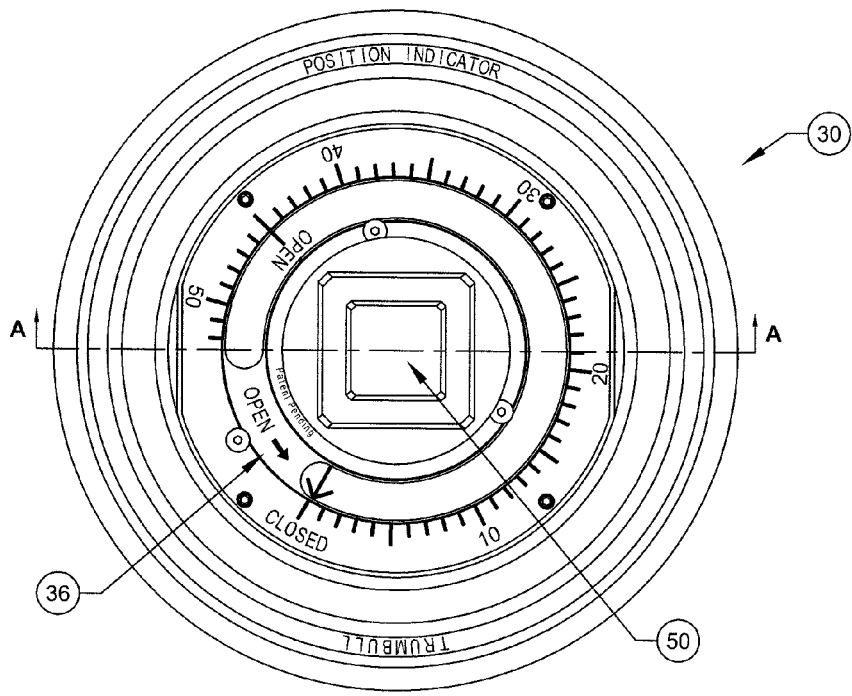
FIG. 6A shows a top view of the position indicator with a square nut inside an adapter for underground valves.
Figure 6B:
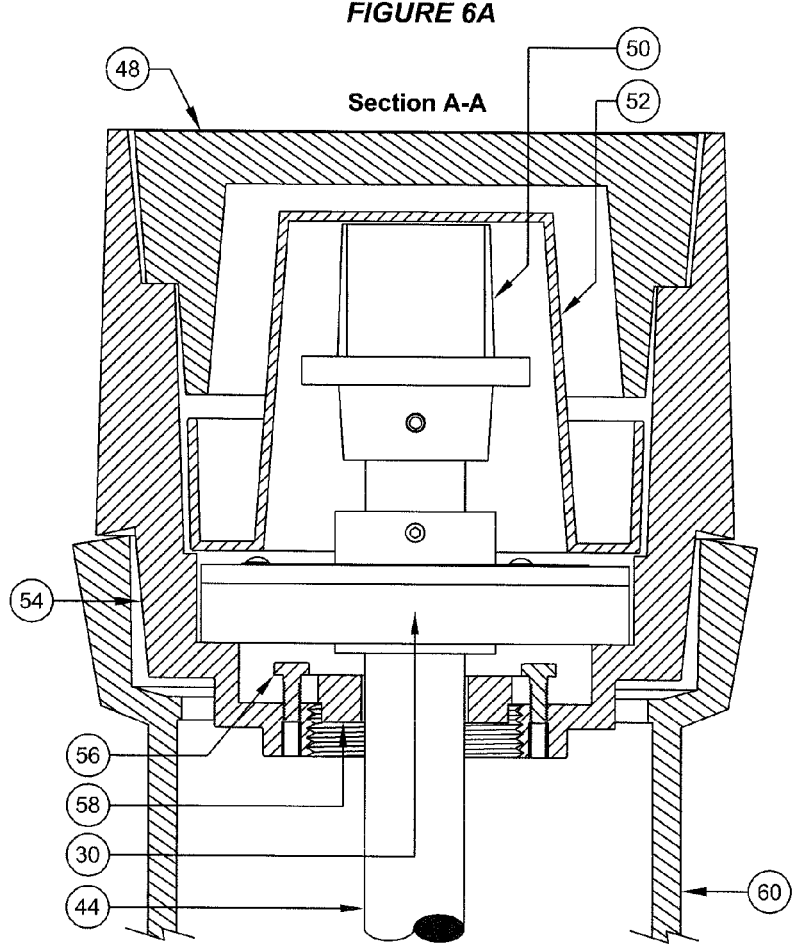
FIG. 6B shows a sectional view of the position indicator installed in an adapter, with a debris shield, square nut and valve box lid, for underground valves.
Figure 8:
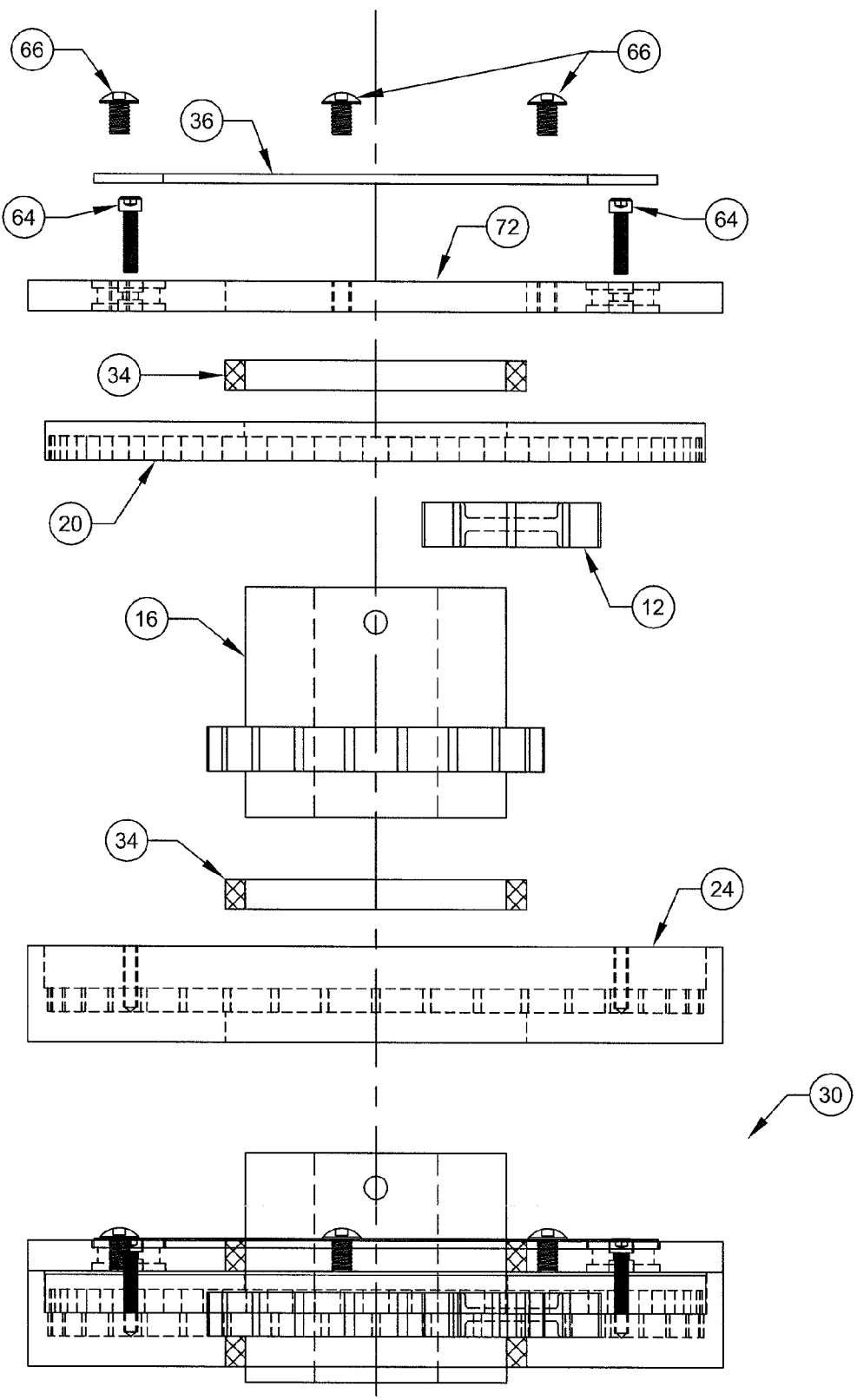
FIG. 8 shows an exploded view of the position indicator.
Figure 9A:
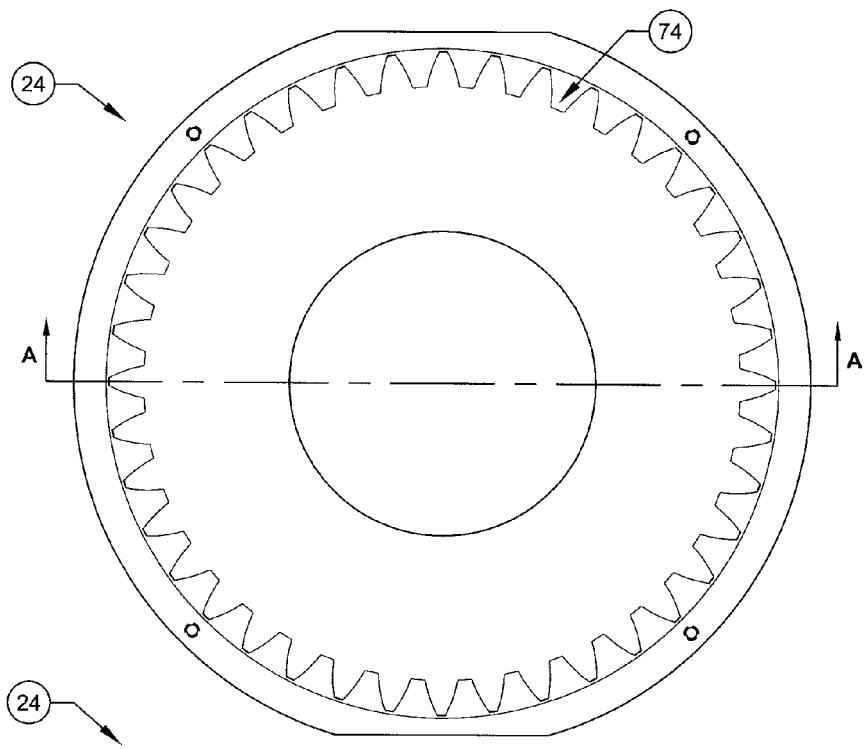
FIG. 9A shows the top surface of the bottom ring gear.
Figure 9B:
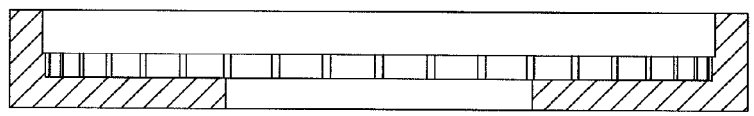
FIG. 9B shows a sectional view of the bottom ring gear.
Figure 9C:
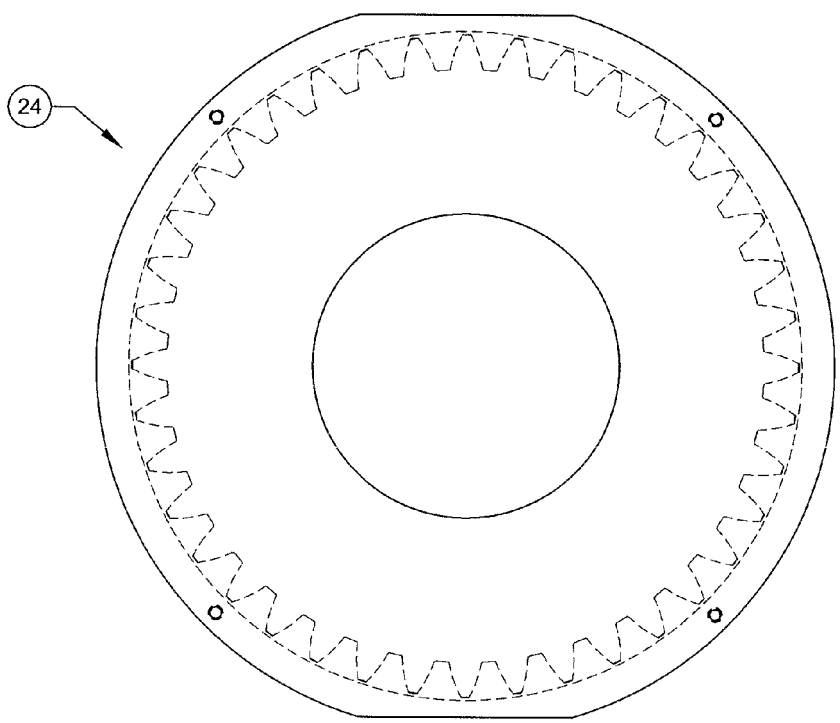
FIG. 9C shows the bottom surface of the bottom ring gear.

In another embodiment, the adapter 54 allows the use of round extension stems up to 1⅞" outside diameter. This is significant in the case of larger sizes of valves, that require more torque to operate and therefore larger sizes of extension stem to operate, without twisting. In one embodiment, the adapter 54 has pipe threads at the bottom. Pipe nipple 62 allows the adapter 54 to be height-adjustable in case the concrete flooring is too thick. In another embodiment, a bushing 58 can be provided inside the adapter 54 surrounding the extension stem 44, as shown in FIGS. 6B and 7C. Bolts 56 can also be provided for securing purposes.

In one embodiment of the invention, the user can double the number of turns simply by interchanging a ring gear 20 with another, having one less tooth 22, then making a corresponding change in the scale plate 72. The changing of these two components is simple and can be done easily in the field, or in a distributor's warehouse.

Multiple embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

We claim:

1. A valve position assembly comprising:
   a sun gear;
   at least one planet gear;
   at least two ring gears, wherein the planet gear engages with the sun gear and the ring gears, wherein the planet gear has a diameter which is smaller than a diameter of the sun gear, and the diameter of the planet gear is smaller than a diameter of the ring gears, wherein the ring gears are operatively connected to each other, wherein the gears have teeth around the circumference of the gears, wherein a top ring gear has more teeth than a bottom ring gear, wherein the bottom ring gear is a fixed gear and the top ring gear is a floating gear;
   a scale plate, wherein the scale plate comprises a first side and a second side opposite the first side, wherein each of the first and second sides have a turn number indicator; and
   an adjustable window, wherein the window comprises an indicating line, wherein the adjustable window is operatively connected to the scale plate;
   wherein the scale plate is adjustable into:
   (1) a first position where the turn number indicator on the first side is suitable for use with a first associated valve that opens in a first direction; and
   (2) a second position where the turn number indicator on the second side is suitable for use with a second associated valve that opens in a second direction that is opposite the first direction.

2. A valve position assembly comprising:
   a sun gear;
   at least one planet gear;
   at least two ring gears comprising a top ring gear and a bottom ring gear, wherein the top and bottom ring gears are operatively connected to each other;
   a scale plate, wherein the plate comprises a position indicator comprising a turn number indicator, wherein the turn number indicator is on the scale plate; and
   an adjustable window, wherein the window comprises an indicating line and an open/close indicator, wherein the adjustable window is operatively connected to the scale plate;
   wherein the at least two ring gears have teeth around the circumference of the gears and wherein the top ring gear has more teeth than the bottom ring gear;
   wherein the planet gear engages with the sun gear and the ring gears, wherein the planet gear has a diameter which is smaller than a diameter of the sun gear, and the diameter of the planet gear is smaller than a diameter of the ring gears; and
   wherein the adjustable window is located in an annular recess in the scale plate, wherein the annular recess has a slot in the center with an angle of approximately 300°.

3. The assembly of claim 2, wherein the bottom ring gear has a recessed cavity that accepts the top ring gear, wherein the top ring gear rotates within the bottom ring gear's recessed cavity.

4. The assembly of claim 3, wherein the bottom ring gear is a fixed gear and the top ring gear is a floating gear.

5. The valve position assembly of claim 1 further comprising:
   an adapter;
   a lid, wherein the lid fits within the adapter;
   an operating nut, the operating nut operatively connected to a valve extension stem, wherein the extension stem operatively connects to the scale plate; and
   a debris shield.

6. The valve position assembly of claim 5, wherein the debris shield further comprises:
   an outwardly extending annular pocket.

7. The valve position assembly of claim 1 wherein the scale plate is adjustable from the first position to the second position by flipping the scale plate substantially 180 degrees.

8. The valve position assembly of claim 7 further comprising a floorstand, wherein the scale plate is mounted on top of the floorstand.

9. The valve position assembly of claim 1 further comprising:
   a first seal between the sun gear and the scale plate, and
   a second seal between the sun gear and the bottom ring gear.

10. The valve position assembly of claim 7 wherein the adjustable window comprises a flat transparent ring.

11. The valve position assembly of claim 10 wherein the gears and teeth are made of a self-lubricating, low-friction polymer.

12. The valve position assembly of claim 10 wherein the top ring gear has at least 2 more teeth than the bottom ring gear.

13. The valve position assembly of claim 6 wherein the debris shield further comprises:
   a first end perpendicular to an axis about which the sun gear rotates and closest to the scale plate;
   a second end perpendicular to the axis about which the sun gear rotates and furthest from the scale plate; and
   inclined frustoconical sides such that an inner diameter of the pocket at the first end of the shield is greater than an outer diameter of the shield at the second end of the shield.

14. The valve position assembly of claim 5 further comprising:
   a threaded pipe nipple;
   wherein the adapter is threaded and is screwed onto the pipe nipple, and
   wherein a height of the adapter in relation to the pipe nipple can be adjusted by an amount of screwing of the adapter onto the pipe nipple.

\* \* \* \* \*

UNITED STATES PATENT AND TRADEMARK OFFICE
CERTIFICATE OF CORRECTION

PATENT NO. : 8,550,115 B2  
APPLICATION NO. : 12/831745  
DATED : October 8, 2013  
INVENTOR(S) : Blake J. Emanuel and Francis Craig Newmeyer Page 1 of 1

It is certified that error appears in the above-identified patent and that said Letters Patent is hereby corrected as shown below:

Title Page, Item (73) Assignee: delete "Trumbull Industries Inc., Youngstown, OH (US)" and insert --Trumbull Manufacturing, Inc., Youngstown, OH (US)--

Signed and Sealed this  
Twenty-second Day of April, 2014

Michelle K. Lee  
*Deputy Director of the United States Patent and Trademark Office*